Patented May 1, 1951

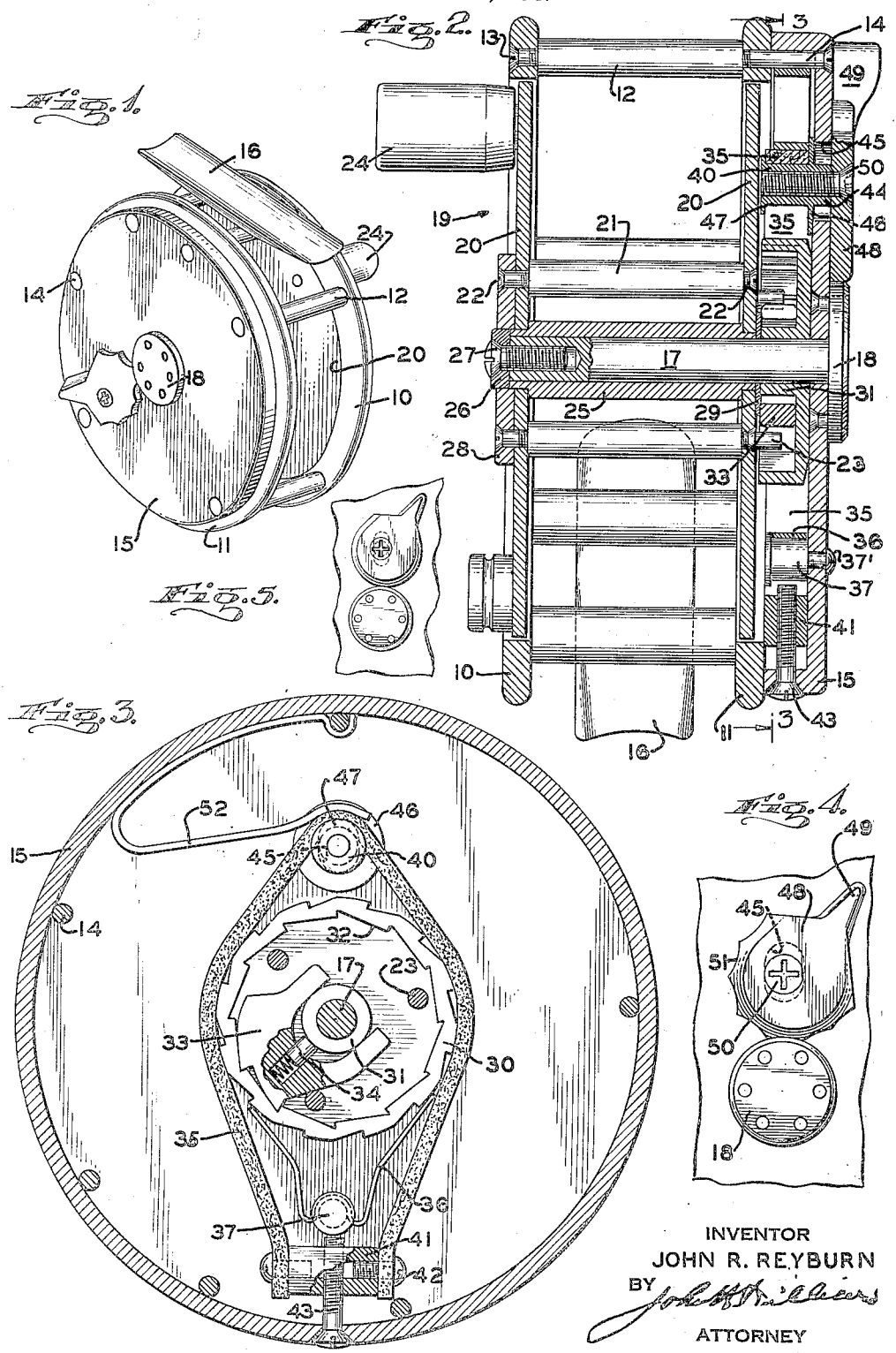

2,551,567

UNITED STATES PATENT OFFICE 2,551,567

FISHING REEL

John R. Reyburn, Fairfield, Conn.

Application January 4, 1947, Serial No. 720,136

3 Claims. (Cl. 242—84.6)

This invention relates to fishing reels and has particular reference to the drag and click mechanisms of a fly reel having such mechanisms.

Fishing for sport involves the use of the lightest possible tackle commensurate with the weight and agility of the fish and with the conditions under which the fishing is done. The fisherman relies upon his reel (in the case of large, strong fish) to tire the fish, and upon the boatman, if he is in a boat, to so direct the boat as to prevent the fish from taking all of the line from the reel and then parting it. The relation between the movement of the fish and of the boat is usually an attempt to lessen the distance between them on the part of the boatman.

However, the attempts of the boatman to fulfill his part of the enterprise is complicated by the fact that he must usually watch the water, and in some cases cannot even see the fisherman, although he can see the line extending from the water. It is very difficult to determine whether a line is being taken in or paid out by observing it near the water, and consequently the boatman is uncertain of what is expected of him. This results in a lack of teamwork that lessens the sport, risks losing the fish and endangers the tackle used.

With the above in mind, it is an object of the present invention to provide a fishing reel with an adjustment for the drag which is adaptable to the fishing of many types of waters and to the taking of a variety of species and sizes of fish.

It is a further object of this invention to provide a reel with a drag which can be readily adjusted during playing of a fish and may be further adjusted over a wide range in preparation for different types of fishing.

It is a further object of the present invention to provide a fishing reel which unmistakably indicates by sound whether the line is being taken in or taken off the spool.

Referring now to the drawings:

Fig. 1 is a perspective view of a reel embodying one form of the present invention;

Fig. 2 is a section taken through the axis of rotation of the reel of Fig. 1;

Fig. 3 is a section taken at line 3—3 in Fig. 2; and

Fig. 4 is a fragmentary view of a part shown in Fig. 1;

Fig. 5 is a view similar to Fig. 4 of a modified form of the invention.

The shown construction is a reel intended for fishing with a fly rod. A pair of rings 10 and 11 is held in spaced relation by several pillars 12. These pillars are secured by screws 13 to the end ring 10 and by screws 14 to the end ring 11 and side plate 15. The entire reel is intended to be supported on the reel seat of the rod by a seat plate 16 which is secured to two of the pillars 12 by any suitable means. The side plate is generally in the shape of a shallow cup with its rim resting on the ring 11 to provide a space for the mechanisms to be described.

An axle 17 is secured to the side plate 15 by means of rivets passing through the head 18 of the axle and the plate 15. On this axle is mounted a spool 19, which consists essentially of a pair of flanges 20 held in spaced relation by pillars 21 secured to the flanges by screws 22. One or more driving studs 23 project from one flange for operating the drag and click mechanism. The other flange is provided with the usual handle 24 for rotating the spool.

The hub of the spool 19 comprises a tube 25 which is held in place by the flanges 20. This hub may be made of any suitable bearing material, and, as portions of reduced diameter extend through the flanges, the hub also prevents axial play. On the outer end of the axle 17 there is provided a washer 26 which engages the end of the tube 25 and prevents the spool from coming off when screw 27 is in place. A small circular plate 28 mounted on the spool surrounds this washer to prevent entry of grit and the like and also to improve the appearance of the reel. The inner end of the tube 25 bears against a washer 29 which in turn bears against a brake drum.

The brake mechanism is similar to that described in my copending application Serial No. 584,277, filed March 23, 1945, for a "Fishing Reel," now Patent No. 2,460,904, dated February 8, 1949, but with differences which will become apparent as the description proceeds. A brake drum 30 is journaled about the axle 17 on hub 31 which is integral with the drum. The interior of the drum is furnished with ratchet teeth 32 which are engageable by a pawl 33. This pawl 33 comprises a forked member furnished with one or more teeth to engage the ratchet teeth 32. A spring-driven plunger 34 extends from the interior of the fork and engages the hub, yieldingly urging the pawl teeth into engagement with the ratchet teeth. The spring behind the plunger will, however, yield sufficiently to permit the pawl to disengage when it rotates counterclockwise (as viewed in Fig. 3) with respect to the drum.

In order to drive the pawl, the studs 23 project from the side of the spool sufficiently to engage the pawl. These studs may be continuations of the pillars 21 or they may be separately attached. One is sufficient but with one stud the spool will rotate freely in an unwinding direction before the stud goes from one side of the pawl to the other, which might cause too great a strain on the line. It is preferred that evenly spaced studs be used to simplify mounting the spool in the reel frame, as the spool is taken off for oiling or cleaning as often as necessary.

The exterior of the drum is engaged by a brake band 35 and also by a click producing mechanism consisting of a spring 36, which may be of any suitable form to produce a noise. In the shown form it is a generally V-shaped flat spring with both legs terminating in contact with the exterior of the drum, while the vertex is furnished with an inward bend to pass around a headed stud 37 which is secured to the end plate 15 by a screw 37'. The elasticity of the spring holds it in place, assisted by the head on the stud.

In order that the spring produce a noise, a series of notches is cut in the outer surface of the drum 30. These notches are separated sufficiently to leave cylindrical portions between adjacent notches for engagement by the brake band 35.

The spring 36 produces a noise as the spool turns in a counterclockwise direction (as viewed in Fig. 3), in which direction it is intended to turn as line is taken from the reel. The pawl 33 is silent during such rotation, but, upon rotation of the spool in the opposite direction the pawl 33 slips and clicks over the teeth 32 in the drum. The noise produced by the pawl is quite distinct from that produced by the spring, as the pawl is a heavier piece of material. If desired, the spring 36 may be shaped to produce a more ringing tone by an increase in length and sinuosity.

Brake band 35 is provided with novel adjustment means to increase the adaptability of the reel to different types of fishing and at the same time to increase the ease and rapidity with which the reel can be adjusted during actual playing of the fish. The brake band is formed of a strip of material passing over a stud 40 and having its ends fastened to a block 41 by means of screws 42. The block 42 is movable and is adjustable by means of a screw 43 which passes through a tapped hole in the block. Rotation of the screw adjusts the block up or down as may be desired.

The stud 40 is not fixed in position but is formed with a portion 44 passing through a slot 45 in the side plate 15 of the body of the reel. A washer or flange 46 is formed integrally with the body of the stud 40 and a small flange 47 is formed on the end of the body of the stud. The brake band 35 passes around the stud between these two flanges and is held in place thereby.

It can be seen that the stud 40 is movable in a vertical direction (as viewed in Fig. 3). The vertical movement is obtained by means of the cam, or eccentric, 48 which is provided with a finger lever 49 for adjustment. A screw 50 passing through the cam and into the body of the stud 40 holds the stud and cam together. Rotation of the cams 48 causes vertical movement of the stud as the exterior surface of the cam engages the enlarged head 18' of the shaft 17, mounted on the exterior of the plate 15.

For the purpose of enabling the fisherman to gauge the effect of any given motion of the finger piece 49, the working surface 51 of the cam is notched or scalloped so that adjustment causes a definite click as the cam is moved up one notch. In order to hold the parts in adjusted position, especially when low braking tension is applied, a spring 52 may be interposed between the flange of the side plate 15 and the stud 40.

It has been found that the notches in the working face of the cam are not necessary mechanically but may be desirable for the reasons stated above. Accordingly, in Fig. 5 there is shown a fragment of a modified form of device in which the cam surface is smooth and adjustment is made in the usual manner without, however, producing a click as the lever 49 is moved. This has the advantage, especially when the brake bands are under considerable tension, of permitting readier adjustment, as the form shown in Fig. 4 requires a stretching of the brake bands to move the lever from one notch to the other, regardless of the direction of motion. If desired, the advantages of the forms shown in both figures may be obtained by utilizing notches in the portion of the cam which is engaged when it is adjusted for low tension, leaving the rest smooth. In that case, the notches will keep the cam from being accidently displaced, under low tension on the band, while the cam will be perfectly secure when the belt is under higher tension.

The reel is prepared for the type of fishing anticipated by adjusting the screw 43 so that the range of frictional resistance to rotation achieved by moving the finger piece 49 is as desired. For instance, in fishing with very light tackle and for light fish, the screw is slacked off so that there is little tension on the band even when the finger piece is adjusted to full braking position. For fishing for heavier fish, the screw is tightened as much as the fisherman believes desirable or safe. In the actual process of playing or attempting to land the fish, the fisherman can increase the tension if, for instance, the fish runs toward rapids or falls, and he can throw the tension off to get a free running spool in exigencies such as the fish running under the boat.

At the same time, the boatman is not required to attempt to determine by sight whether the line is running out or coming in. It is simple for him to distinguish the noise made by the spring 36 and that of the pawl, and he can thus determine whether line is running out, being reeled in, or stationary. He can tell at a glance where the line is pointing, and thus has as accurate a picture of the antics of the fish as the fisherman, and can thus manage the boat to the fisherman's advantage.

It is to be understood that the above description is intended to be illustrative and not limitative, and that the invention can be best understood from the appended claims.

I claim:

1. Adjusting means for the brake band of a fishing reel including a side plate on the reel having a slot therethrough, a stud member in said slot engaging the brake band and effective upon movement along said slot to change the tension on the brake band, a cam operatively connected to the member and bearing against an abutment on the side plate, and means for manually rotating the cam to move the member along said slot.

2. Adjusting means for the brake band of a fishing reel including a side plate on the reel having a slot therethrough, a stud in said slot around which the brake band passes, said stud being effective upon movement along said slot to change the tension in said brake band, a cam mounted on said stud and bearing against an abutment on the side plate, and means for manually rotating the cam to move the stud along said slot.

3. In a fishing reel having a spool and a reel frame, the combination of a drum rotatable about the spool axis, said drum having interior ratchet teeth and a plurality of spaced exterior notches forming ratchet teeth, the notches being spaced to leave cylindrical crests on the teeth, a pawl straddling the spool axis and adapted to engage the interior teeth of the drum, means operatively connecting the pawl with the spool for rotation therewith, a pawl on the reel frame engaging the exterior teeth of the drum, a brake band extending around the exterior ratchet teeth and in engagement with the crests thereof, said band being secured to a pair of movable members situated substantially diametrically opposite each other with respect to the drum.

JOHN R. REYBURN.

REFERENCES CITED

The following references are of record in the file of this patent:

UNITED STATES PATENTS

| Number | Name | Date |
| --- | --- | --- |
| 467,482 | King | Jan. 19, 1892 |
| 618,599 | Chapin | Jan. 31, 1899 |
| 1,398,429 | Harradine | Nov. 29, 1921 |
| 1,480,050 | Dotzer | Jan. 8, 1924 |
| 1,725,907 | Germonprez | Aug. 27, 1929 |
| 1,845,846 | Norton | Feb. 16, 1932 |
| 2,059,765 | Adams | Nov. 3, 1936 |
| 2,331,210 | Lundblad | Oct. 5, 1943 |
| 2,417,732 | Bland et al. | Mar. 18, 1947 |

FOREIGN PATENTS

| Number | Country | Date |
| --- | --- | --- |
| 11,134 of 1905 | Great Britain | May 26, 1906 |